UNITED STATES PATENT OFFICE.

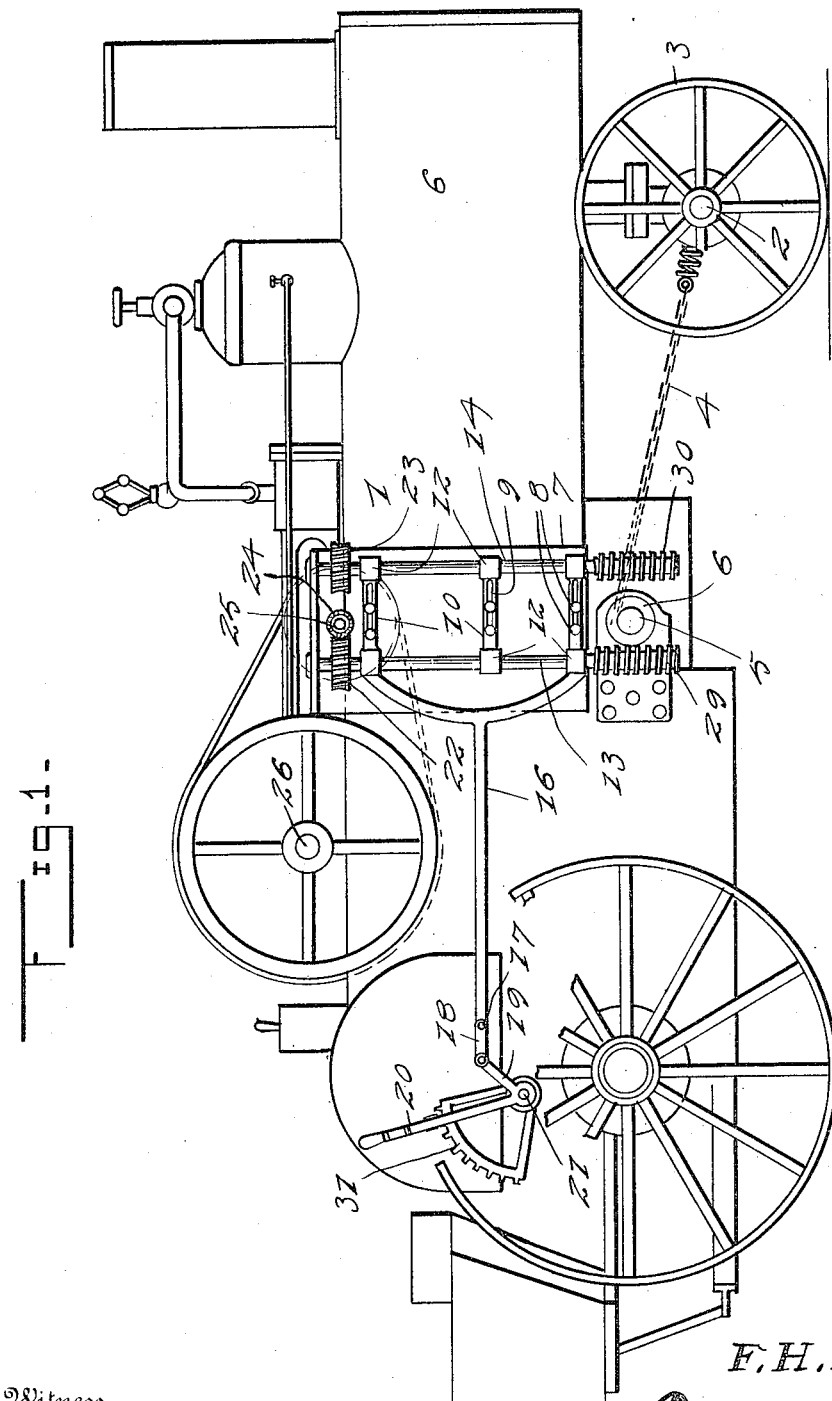

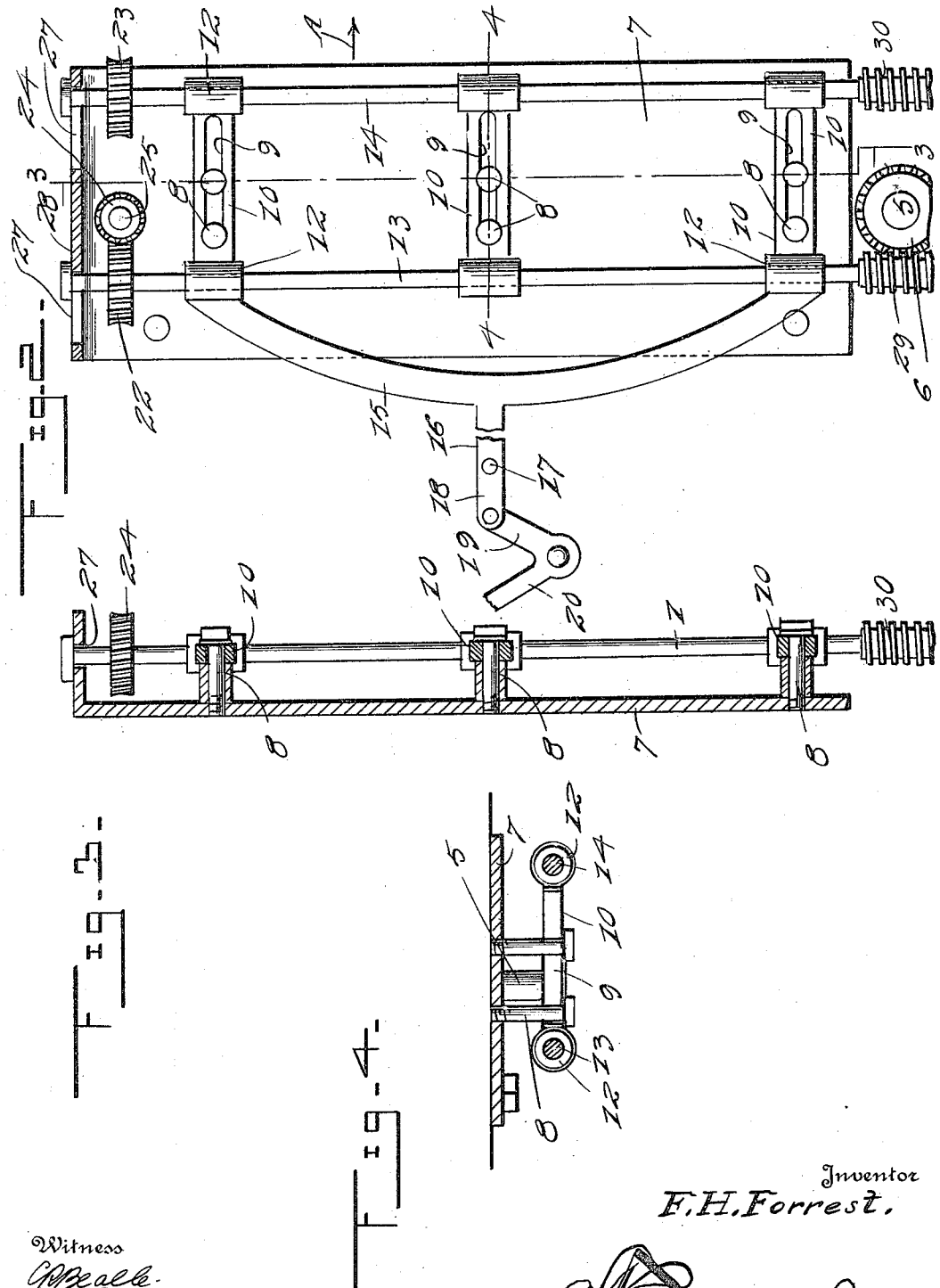

FRANK H. FORREST, OF DAKOTA CITY, NEBRASKA.

POWER STEERING ATTACHMENT FOR TRACTION-ENGINES.

1,235,888.  Specification of Letters Patent.  Patented Aug. 7, 1917.

Application filed May 20, 1916. Serial No. 98,848.

*To all whom it may concern:*

Be it known that I, FRANK H. FORREST, a citizen of the United States, residing at Dakota City, in the county of Dakota and State of Nebraska, have invented certain new and useful Improvements in Power Steering Attachments for Traction-Engines; and I do hereby declare the following to be a full, clear, and exact description of the invention, such as will enable others skilled in the art to which it appertains to make and use the same.

This invention relates to a power steering attachment for traction engines, and the primary object of the invention is to provide a device applicable for attachment to any ordinary type of traction engine, by means of which the power generated by the engine is employed for steering or guiding the front wheels of the tractor for steering the travel of the same.

A further object of this invention is to provide a shiftable structure which includes a pair of vertical shafts, having worms mounted upon their lower ends which are adapted for meshing engagement with the gear carried by the ordinary rotary shaft on which the steering chains are wound; frames which are shiftable for moving either of the worms into engagement with a gear carried by the chain winding shaft, as desired depending upon the direction in which the tractor is to be steered, or for movement so that both of the worms will be out of engagement with the gear and also with means for transmitting power to the shaft.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the traction engine showing the improved power steering attachment attached thereto.

Fig. 2 is a side elevation of the improved power steering attachment showing parts broken away.

Fig. 3 is a section on the line 3—3 of Fig. 2, and

Fig. 4 is a section on the line 4—4 of Fig. 2.

Referring more particularly to the drawings, 1 designates a tractor of any ordinary construction, which has a front axle 2 upon which are mounted the front supporting wheels 3. The front axle 2 has the usual type of steering chains 4 connected thereto, which chains are also connected to a shaft 5 which is rotatably supported beneath the boiler 6 of the tractor. The shaft 5 is ordinary and found on all tractors. A gear 6 is mounted upon the end of the shaft 5.

A plate 7 is attached to the tractor body 1 and it has a plurality of bolts or rods 8 attached thereto and extending outwardly therefrom. The bolts or rods 8 are slidably seated in slots 9 formed in a plurality of bars 10 for slidably connecting the bars to the plate 7. The bars 10 have bearings 12 formed upon their ends which rotatably support vertical shafts 13 and 14.

A yoke 15 is connected to the rear bearing 12 formed upon the upper and lowermost of the plates or bars 10 and it has a bar 16 connected thereto and extending rearwardly along the tractor. The bar 16 is connected as shown at 17 to a link 18, which link is in turn connected to the arm 19 of a hand lever 20. The hand lever 20 is pivotally connected as shown at 21 to the tractor body and is provided for shifting the shafts 13 and 14 and the plates 10 upon oscillatory movement of the lever.

The shafts 13 and 14 have worm gears 22 and 23 respectively mounted thereupon adjacent their upper ends. The worm gears 22 and 23 are adapted for meshing engagement with a worm 24 which is carried by a shaft 25. The shaft 25 is operatively connected in any suitable manner to the main drive shaft 26 of the engine of the tractor.

The upper ends of the shafts 13 and 14 extend through slots 27 formed in a horizontal portion or wing 28 of the plate 7, which slots guide the movement of the upper ends of the shafts.

Worms 29 and 30 are mounted upon the lower end of the shafts 13 and 14 respectively.

A quadrant 31 is attached to the supporting frame 1 of the tractor and it is provided with notches for receiving the lever 20 for holding the lever in various adjusted positions.

When it is desired to direct the front wheels 3 in one direction, for steering the travel of the tractor, the lever 20 is operated for moving the shafts 13 and 14 in the direction indicated by the arrow A in Fig. 2 of the drawings, which will move the worm gear 22 into meshing engagement with the worm 24 and the worm 29 into meshing engagement with the gear 6, which will cause the rotation of the shaft 5 by the rotation of the shaft 13. When it is desired to steer the tractor in the opposite direction, the lever 20 is shifted for moving the worm gear 23 into meshing engagement with the worm 24 which moves the worm 30 into engagement with a gear 6 and rotates the shaft 5 in the direction opposite to that in which it is rotated by the worm 29, for steering the tractor in the opposite direction.

If it is so desired, the belt and pulley by means of which the shaft 25 is connected to the shaft 26, may be eliminated, and the gear 24 mounted directly upon the shaft 26, without departing from the spirit of the invention, in cases where this type of connection can be utilized on a tractor.

From the foregoing description taken in connection with the accompanying drawings, the advantages of construction and of the method of operation of the improved power steering attachment for traction engines will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with a tractor having a steering structure including a shaft, of a plate attached to the tractor, a plurality of bars shiftably connected to said plate, a pair of vertical shafts carried by said bars, a gear mounted upon said steering shaft, worms carried by said vertical shafts and adapted for meshing engagement with said gear at different times, means for shifting said bars and said shaft, and means operatively connected to the prime mover of the tractor for rotating one or the other of said vertical shafts for rotating the steering shaft thereby, after shifting of the bars and shaft.

2. The combination with a tractor having a steering structure including a shaft, of a plate carried by said tractor, a gear mounted upon said steering shaft, a plurality of bars shiftably connected to said plate, vertical shafts rotatably supported by said bars, worms mounted upon the lower ends of said vertical shafts and adapted for meshing engagement with said steering shaft carried gear at different times, a lever operatively connected to certain of said arms for shifting the arms and shafts with respect to said plate, and means carried by said tractor and operatively connected to the prime mover of the same for rotating either of said vertical shafts upon shifting movement thereof for rotating said steering shaft by the rotation of the vertical shafts operatively connected to the prime mover.

3. The combination with a tractor having a steering structure including a shaft, of a gear mounted upon said shaft, a plate carried by said tractor, a plurality of bars shiftably carried by said plate, a pair of vertical shafts rotatably carried by said bars, a lever connected to certain of said bars for shifting the bars with respect to said plate, worms mounted upon the lower ends of said shafts and adapted for meshing with said steering shaft carried gear at different times, a worm gear mounted upon the upper end of each of said shafts, an auxiliary shaft carried by said tractor and operatively connected to the prime mover of the same, a worm carried by said auxiliary shaft, said worm gears adapted for movement into meshing engagement with said auxiliary shaft carried worm upon shifting of the shaft and bars by said lever for rotating said steering shaft by the rotation of either of said vertical shafts.

In testimony whereof I affix my signature in presence of two witnesses.

FRANK H. FORREST.

Witnesses:
E. Z. ENGELEN,
VAIL E. PURDY.

Copies of this patent may be obtained for five cents each, by addressing the "Commissioner of Patents, Washington, D. C."